Figure 1:
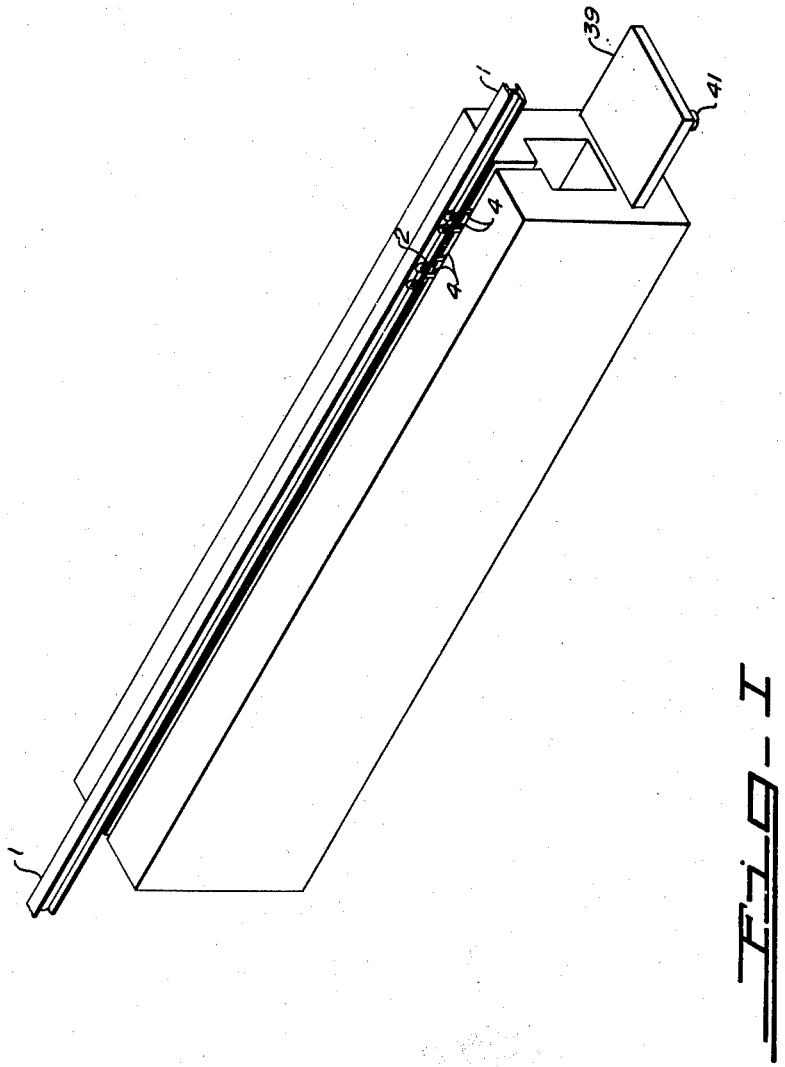

INVENTORS
ALBERT T. ENK
HENRY M. HEYN
BY Charles S. Haughey
ATTORNEY

July 15, 1958     A. T. ENK ET AL     2,843,275
ARTICLE TREATING APPARATUS
Filed Oct. 18, 1954     5 Sheets-Sheet 2
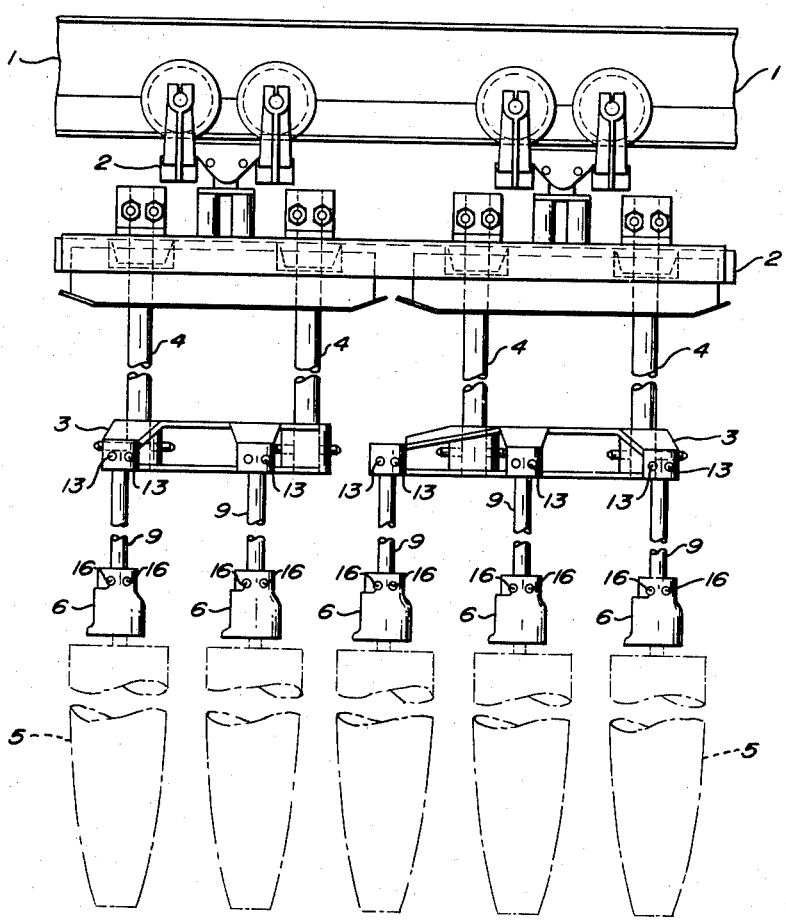
Fig. II
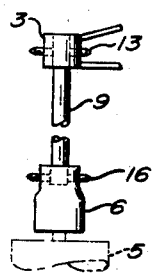
Fig. III
INVENTORS
ALBERT T. ENK
HENRY M. HEYN
BY
Charles S. Haughy
ATTORNEY

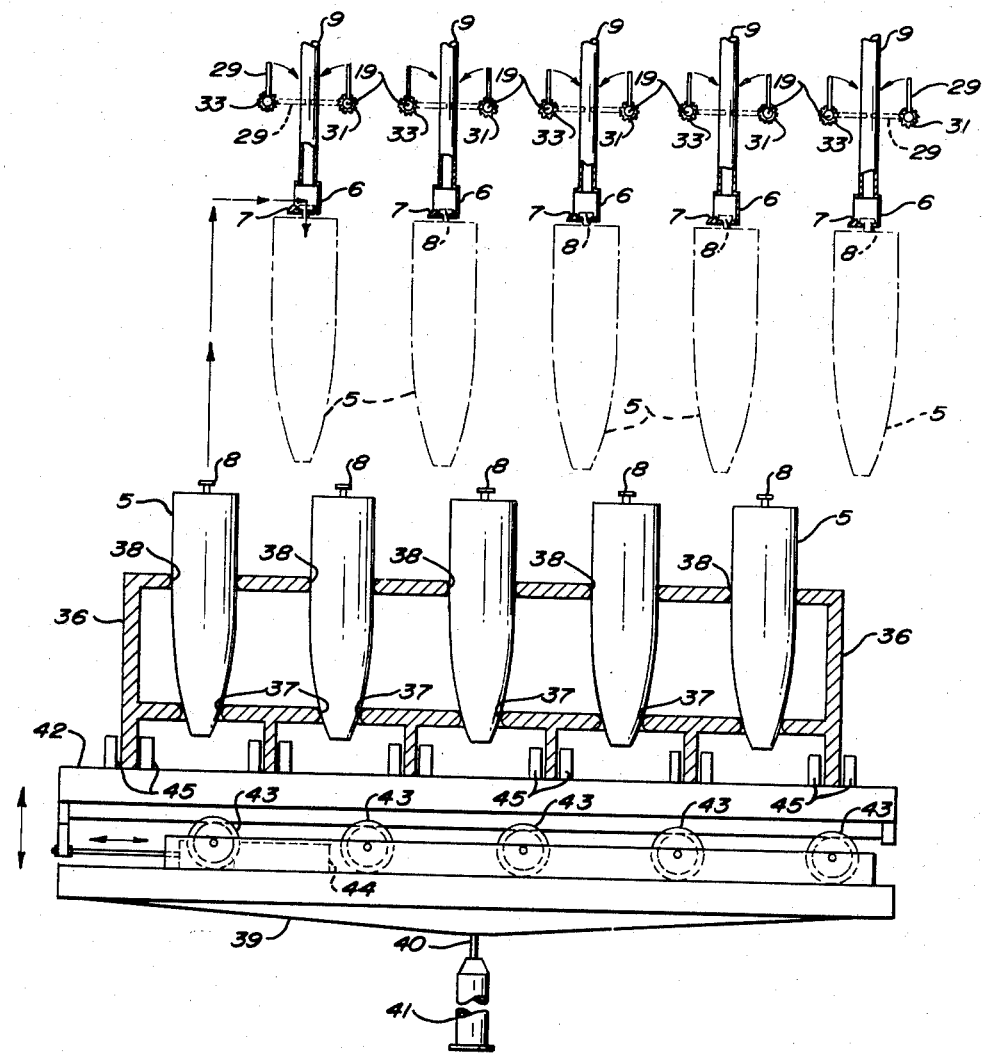

July 15, 1958 A. T. ENK ET AL 2,843,275
ARTICLE TREATING APPARATUS
Filed Oct. 18, 1954 5 Sheets-Sheet 4
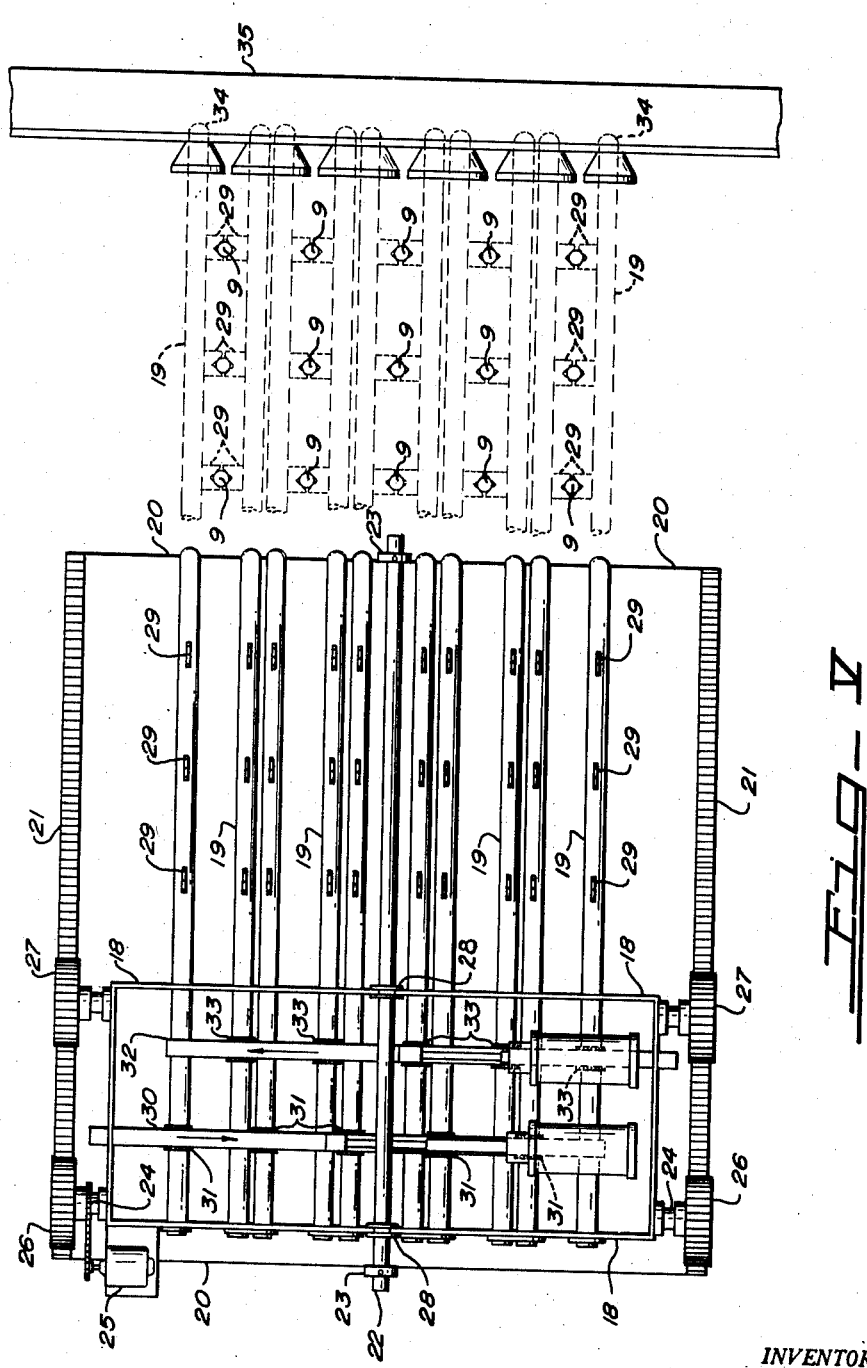
INVENTORS
ALBERT T. ENK
HENRY M. HEYN
BY
*Charles S. Haughey*
ATTORNEY July 15, 1958 A. T. ENK ET AL 2,843,275
ARTICLE TREATING APPARATUS
Filed Oct. 18, 1954 5 Sheets-Sheet 5
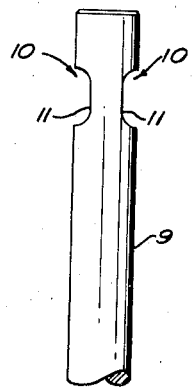
Fig. VI
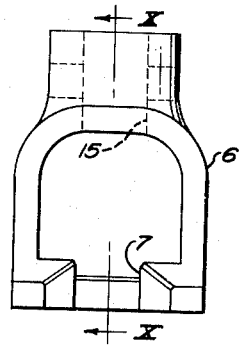
Fig. IX
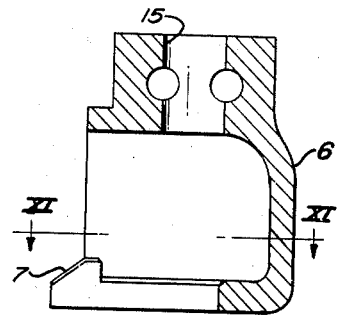
Fig. X
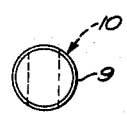
Fig. VII
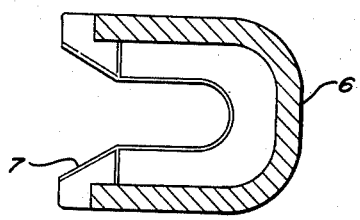
Fig. XI
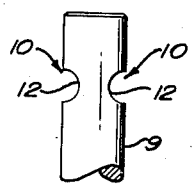
Fig. VIII
INVENTORS
ALBERT T. ENK
HENRY M. HEYN
BY Charles P. Haughey
ATTORNEY

United States Patent Office 2,843,275
Patented July 15, 1958

2,843,275

ARTICLE TREATING APPARATUS

Albert T. Enk and Henry M. Heyn, Toledo, Ohio, assignors to Surface Combustion Corporation, Toledo, Ohio, a corporation of Ohio Application October 18, 1954, Serial No. 462,788

15 Claims. (Cl. 214—18)

This invention relates to article treating apparatus, and more particularly to equipment for simultaneously loading a carriage with a group of articles to be processed and then simultaneously removing the group from the carriage, the loaded carriage moving above a heat treating furnace having a slot in its top through which shafts depending from the carriage extend and to which shafts cluster fixtures are attached for carrying the group of articles through the furnace.

Carriages of the type to which this invention is especially applicable are intended to move above processing apparatus, such as furnaces, and load and unload stations. Cluster fixtures are supported by shafts depending from the carriages and move through slots in the furnace roofs to carry groups of articles through the furnaces. The cluster fixtures permit the suspension of multiple rows of articles to be heat treated while being moved through a furnace without the need for multiple slots in the furnace roof. Hanging from the cluster fixtures are groups of rods arranged in definite patterns, the rods having coupling elements at their lower ends to which the articles are hooked. In the device of this invention, the coupling elements are in the form of matched sockets known as "hanger cups" which receive knobs projecting from articles to be carried.

The principal object of this invention is to provide apparatus by means of which an efficient heat treating process can be carried on and by means of which an efficient mechanical process for the multiple loading and unloading of individual coupling elements can be carried on. More specific objects and advantages are apparent from the following description, in which reference is had to the accompanying drawings illustrating a preferred embodiment of the invention.

Figure I of the drawings is a stripped down perspective view of a furnace having a slot in its top through which shafts depending from an overhead conveyor trolley carriage extend and an elevator located adjacent one end of the furnace, doors, shields, rail supports and other adjuncts being omitted.

Figure II is a side elevational view of an overhead conveyor trolley carriage having a group of individually suspended hanger cups carrying a group of articles, the articles being shown in broken lines.

Figure III is an end elevational view of one of the individually suspended hanger cups shown in Figure II.

Figure IV is a side elevational view, partly in section, of a cage receiver mounted on the elevator, a cage holding a group of articles to be loaded, a group of individually suspended hanger cups, and means for locating and retaining the hanger cups against swinging while being loaded or unloaded, showing schematically a process for the multiple loading of the cups.

Figure V is a plan view of a fork-like locating and retaining device having rockably mounted tines each carrying a series of notched plates, the tines and plates being shown in locating and retaining position in broken lines.

Figure VI is an elevational view of a hanger rod.

Figure VII is a plan view of the hanger rod shown in Figure VI.

Figure VIII is an elevational view of the upper portion of a second embodiment of the hanger rod.

Figure IX is an elevational view of the hanger cup.

Figure X is a sectional view taken along the line X—X of Figure IX.

Figure XI is a sectional view taken along the line XI—XI of Figure X.

These specific drawings and the specific description that follows merely disclose and illustrate the invention, and are not intended to impose limitations upon the claims.

Article treating apparatus embodying the present invention includes a furnace, a cage receiver located adjacent one end of said furnace, a track extending horizontally above said furnace and said cage receiver, a carriage supported by said track for travel therealong, said furnace having a top with a slot extending beneath said track, a plurality of shafts depending from said carriage and arranged to travel through said slot as said carriage travels along said track, fixture means carried by the lower ends of said shafts, a plurality of rods hanging from each of said fixture means, said hanging rods being arranged in a definite pattern, a cage having receptacles for articles to be treated, said receptacles being so arranged as to support such articles in a pattern corresponding to the pattern in which said hanging rods are arranged, means for locating said cage in a definite position on said cage receiver, coupling elements for connecting such articles to the lower ends of said hanging rods, means for moving said cage receiver to couple said coupling elements and subsequently to remove said cage from such articles, and means for locating and retaining said hanging rods against swinging movement while such coupling is being effected.

In the apparatus disclosed in the drawings a suitably mounted track 1 extends horizontally above a furnace (Figure I) and supports an overhead conveyor trolley carriage 2. The carriage 2 includes a plurality of fixture means or cluster fixtures 3 which may be suspended below the furnace roof by means of depending shafts 4 arranged to travel through a slot in the top of the furnace as the carriage 2 travels along the track 1. The cluster of fixtures 3 permits the suspension of multiple rows of articles 5 to be heat treated while being moved through the furnace without the need for multiple slots in the furnace roof. Only the end article 5 of each transversely extending row of articles can be seen in Figures II and IV. "Transversely extending" is used herein to mean extending in a direction transverse to the path of movement of the carriage 2.

A plurality of coupling elements or hanger cups 6 are individually suspended from the cluster fixtures 3. The coupling elements may be any desired form of hook, but they are preferably in the form of hanger cups having flared entryways 7 (Figures IX, X and XI) for the self-guided receival of knobs protruding from the articles 5. The articles 5, as specifically shown, are taper ended, cylindrically shaped projectiles having T-shaped bosses 8 formed during the rough machining of the boat-tail ends of the projectiles, whereby the projectiles may be suspended nose down from the hanger cups 6. However, the articles 5 may be of any shape having any suitable type of attached or attachable connectors, e. g., connectors in the form of eyes, which cooperate with the hook coupling elements.

Both vertical and horizontal play of the hanger cups 6 is necessary so that the cups may be accurately located at several stations, such as load and unload stations. During the multiple loading of a group of articles 5, the hanger cups 6 must be free to move vertically to accommodate knobs at various elevations. The free vertical movement of each cup 6 must be independent of the vertical movement of the other cups. The hanger cups 6 must also be independently horizontally movable so that they can be horizontally located at the various stations.

The independent vertical and horizontal play of each of the hanger cups 6 is made possible by the unique construction of the present means for individually suspending each hanger cup from a cluster fixture 3. The means for suspending includes a plurality of hanging rods 9 arranged in a definite pattern, there being one rod for each cup. Each rod has a pair of notches 10 (Figures VI, VII and VIII) near its upper end. Preferably each notch 10 has a substantially parallel flat-bottomed, dish-shaped outline 11 as shown in Figure VI. However, the notches 10 may have any suitable shape, e. g., an arcuately shaped outline 12 as shown in Figure VIII. A set of spaced pins 13 is provided (Figures II and III) for each pair of notches 10, the pins and cooperating notches forming a joint between each of the upper ends of the rods 9 and the cluster fixtures 3. The pins 13 are mounted in the cluster fixtures 3 with their axes extending substantially at the same elevation and transverse to the path of movement of the carriage 2 and each pin engages a notch 10, whereby the rods 9 are loosely suspended from the cluster fixtures and are permitted to have vertical and horizontal play, i. e., each rod 9 is free to swing horizontally and is free to move vertically between its set of cooperating pins 13. When the notches 10 have the substantially arcuate outline 12, the radii of curvature of the pins 13 must be less than the radii of curvature of the notches. The bottom ends of the rods 9 extend into holes 15 in the tops of the hanger cups 6 and are fixed therein by means of pins 16 which extend through the hanger cups 6 and engage notches 17 adjacent the bottom ends of the rods 9.

When the hanger cups 6 are being loaded or unloaded, it is necessary to avoid horizontal motion of the cups to overcome the tendency of the cups to be pushed away from the T-shaped bosses 8 while the bosses are moving into the cups or the tendency to be carried along with the T-shaped bosses 8 while the bosses are moving out of the cups. To accomplish this restriction of horizontal motion without influencing vertical motion of the hanger cups 6, which vertical motion or play is necessary so that the cups can accommodate the T-shaped bosses 8 at various elevations, means is provided for horizontally locating and retaining the hanger cups 6 in definite positions, the means being in locating and retaining position when the hanger cups are being loaded or unloaded.

The means for horizontally locating and retaining the hanger cups 6 includes a fork 18 (Figure V) movable in a direction transverse to the path of movement of the carriage 2 and having rockably mounted tines 19. The fork 18 is supported by a suitably mounted frame 20 having a rack 21 fixed along each of its upper sides and a guide rod 22 fixed to a pair of brackets 23 on the frame and lying midway between the racks 21, the guide rod 22 being parallel to the racks 21. The racks 21 form a trackway along which the fork 18 may travel forward and back. A shaft 24 journaled in the fork 18 is driven by a motor 25 carried by the fork, which shaft turns a pair of drive gears 26 cooperating with the racks 21. Two idler gears 27 are also rotatably mounted on the fork 18 and help guide the fork along the trackway when the drive gears 26 are operating. To prevent the fork 18 from yawing from its path of movement, a pair of guide rings 28 cooperating with the fixed guide rod 22 are attached to the fork and act as a sliding centerguide for the fork.

Each tine 19 carries a series of notched plates 29 spaced the same distance apart as the distance between the rods 9 in each transversely extending row of rods. In the retracted position of the fork 18 and when the fork is traveling forward or back, the notched plates 29 are turned up as shown in solid lines in Figures IV and V. Means are provided for rocking the tines through 90° when the fork is in locating and retaining position, which position is shown in dotted lines in Figures IV and V. The means for rocking includes a first pneumatically operated rack 30 carried by the fork 18 cooperating with a first set of pinions 31 fixed one on every other tine 19 and a second pneumatically operated rack 32 also carried by the fork 18 cooperating with a second set of pinions 33 fixed one on each of the other tines 19. When the fork 18 is fully advanced, a tine 19 is located in front of and behind each transversely extending row of rods 9 and a notched plate 29 is located in front of and behind each rod 9. In the advanced position of the fork 18, a cantilevered end 34 of each tine 19 engages a seat in a rigidly mounted fixture 35 which firmly supports and accurately positions each tine, as shown in broken lines in Figure V. Also shown by the broken lines in Figure V, when the fork 18 is fully advanced and when the means for rocking the tines is operated, the first rack 30 turns every other tine through 90° so that a notched plate 29 engages one side of every rod 9 and the second rack 32 turns the rest of the tines through 90° so that a notched plate 29 engages the other side of every rod 9, whereby a pair of notched plates 29 locate and retain each rod in definite horizontal position. The arrows in Figure V indicate the direction of movement of the racks 30 and 32 when the notched plates 29 are turned from their positions shown in solid lines in Figure V to their hanger rod engaging positions shown in broken lines in Figure V. The curved arrows in Figure IV indicate the manner in which the notched plates 29 are turned 90° into hanger rod locating and retaining position, which position is shown in broken lines. One of the important features of the present invention is the foregoing described means for avoiding horizontal motion of the hanger cups 6 during loading or unloading without hindrance to the vertical play of the cups.

Referring to Figure IV showing a loading station, it can be seen that an essential requirement for loading the articles 5 in multiples is that the vertical alignment of the T-shaped bosses 8 be held within rather narrow limits when entering the individual hanger cups 6. It is also necessary that the articles 5 be brought to the loading and unloading stations on spaced centers corresponding to the spacing of the hanger cups 6. It is thus necessary to provide means for maintaining the articles 5 vertical and parallel to each other and at the same elevation with respect to their upper ends. Means for loading and unloading the articles 5 into and out of the hanger cups 6 comprises a loading and unloading cage 36 having a plurality of receptacles, each receptacle including a limit ring 37 near the bottom of the cage for seating the tapered lower end of the article, the limit ring 37 maintaining the article at a level elevation with every other article in the cage, and a guide ring 38 directly above the limit ring 37 for maintaining the article in vertical and parallel relationship to every other article in the cage. It is necessary to use the limit rings 37 instead of the nose ends of the articles to control the elevation of the articles, since the articles, as specifically shown, are projectiles having wide variations in the lengths of the nose ends as forged. The receptacles are arranged to support the articles in a pattern corresponding to the pattern in which the hanger rods 9 are arranged.

The means for loading and unloading the hanger cups 6 with articles 5 also comprises an elevator 39 located adjacent one end of the furnace and mounted on the end of a vertically operating piston rod 40 of a pneumatic cylinder 41. The elevator 39 carries a cage receiver 42 horizontally traversable over a plurality of rollers 43 rotatably mounted on the elevator. A horizontal pneumatic cylinder 44 provides a means for driving the traversable cage receiver 42. Guides 45 fixed to the top of the cage receiver 42 insure precise positioning of the cage 36. The elevator 39 raises or lowers the cage 36 and the traversable cage receiver 42 moves the cage 36 in and out in relation to the hanger cups 6 when the elevator is raised.

In operation, the present article treating apparatus is used to carry on an extremely efficient mechanical process for the multiple loading and unloading of the individual hanger cups 6, as shown schematically in Figure IV. In the overall loading process, a group of articles 5 are placed into the loading and unloading cage 36 which provides accurate positioning of the individual T-shaped bosses 8 with respect to another both horizontally and vertically. The loaded cage 36 is then placed onto the cage receiver 42 so that the guides 45 insure precise location of the cage. The individually suspended hanger cups 6 which have flared entryways for the self-guided receival of the T-shaped bosses 8 are then moved into position over the loaded cage 36. At this time, both vertical and horizontal play of the hanger cups 6 is permitted because of the unique construction and suspension of the notched hanging rods, as hereinbefore described. This play is necessary for the proper operation of the hanger cups 6. Subsequent to the movement of the hanger cups 6 into position over the loaded cage 36, the rods 9 are located and retained horizontally without hindrance to their vertical play, by means of the fork 18 which is advanced between the transverse rows of rods 9. The elevator cycle then begins, which cycle is indicated by means of the double ended arrows in Figure IV. The first motion of the elevator is to raise the T-shaped bosses 8 to the elevation of the hanger cups 6. The cage receiver 42 then advances longitudinally towards the cups. Upon contact of the articles with the cups, the cups are lifted by the boat-tail ends of the articles and thus made to assume their several positions to accommodate the T-shaped bosses 8. The advancing motion ceases precisely at the moment that the T-shaped bosses are centered in the cups. The elevator 39 then descends, depositing the knobs into the cups and suspending the group of individual articles which have been mechanically loaded in multiples. The cage receiver 42 now returns to its original position and the fork 18 releases the rods 9 and retracts to allow the carriage 2 to resume motion. The overall unloading process is similar except, of course, that the steps are carried out in sequence reverse to the sequence of the steps of the loading process.

Various modifications may be made in specific details of construction without departing from the spirit and scope of the invention.

Having described the invention, we claim:

1. Article treating apparatus comprising, in combination, a furnace, a cage receiver located adjacent one end of said furnace, a track extending horizontally above said furnace and said cage receiver, a carriage supported by said track for travel therealong, said furnace having a top with a slot extending beneath said track, a plurality of shafts depending from said carriage and arranged to travel through said slot as said carriage travels along said track, fixture means carried by the lower ends of said shafts, a plurality of rods hanging from each of said fixture means, said hanging rods being arranged in a definite pattern, a cage having receptacles for articles to be treated, said receptacles being so arranged as to support such articles in a pattern corresponding to the pattern in which said hanging rods are arranged, means for locating said cage in a definite position on said cage receiver, coupling elements for connecting such articles to the lower ends of said hanging rods, and means for moving said cage receiver to couple said coupling elements and subsequently to remove said cage from such articles.

2. Article treating apparatus comprising, in combination, a furnace, a cage receiver located adjacent one end of said furnace, a track extending horizontally above said furnace and said cage receiver, a carriage supported by said track for travel therealong, said furnace having a top with a slot extending beneath said track, a plurality of shafts depending from said carriage and arranged to travel through said slot as said carriage travels along said track, fixture means carried by the lower ends of said shafts, a plurality of rods hanging from each of said fixture means, said hanging rods being arranged in a definite pattern, a cage having receptacles for articles to be treated, said receptacles being so arranged as to support such articles in a pattern corresponding to the pattern in which said hanging rods are arranged, means for locating said cage in a definite position on said cage receiver, coupling elements for connecting such articles to the lower ends of said hanging rods, means for moving said cage receiver to couple said coupling elements and subsequently to remove said cage from such articles, and means for locating and retaining said hanging rods against swinging movement while such coupling is being effected.

3. Article treating apparatus comprising, in combination, a furnace, a cage receiver located adjacent one end of said furnace, a track extending horizontally above said furnace and said cage receiver, a carriage supported by said track for travel therealong, said furnace having a top with a slot extending beneath said track, a plurality of shafts depending from said carriage and arranged to travel through said slot as said carriage travels along said track, fixture means carried by the lower ends of said shafts, a plurality of rods hanging from each of said fixture means, said hanging rods being arranged in a definite pattern, a cage having receptacles for articles to be treated, said receptacles being so arranged as to support such articles in a pattern corresponding to the pattern in which said hanging rods are arranged, means for locating said cage in a definite position on said cage receiver, coupling elements for connecting such articles to the lower ends of said hanging rods, means for moving said cage receiver to couple said coupling elements and subsequently to remove said cage from such articles, and means for locating and retaining said hanging rods against swinging movement while such coupling is being effected, said means for locating and retaining comprising a fork movable in a direction transverse to the path of movement of said carriage.

4. Article treating apparatus comprising, in combination, a furnace, a cage receiver located adjacent one end of said furnace, a track extending horizontally above said furnace and said cage receiver, a carriage supported by said track for travel therealong, said furnace having a top with a slot extending beneath said track, a plurality of shafts depending from said carriage and arranged to travel through said slot as said carriage travels along said track, fixture means carried by the lower ends of said shafts, a plurality of rods hanging from each of said fixture means, said hanging rods being arranged in transversely extending rows, a cage having receptacles for articles to be treated, said receptacles being so arranged as to support such articles in a pattern corresponding to the pattern in which said transversely extending hanging rods are arranged, means for locating said cage in a definite position on said cage receiver, coupling elements for connecting such articles to the lower ends of said hanging rods, means for moving said cage receiver to couple said coupling elements and subsequently to remove said cage from such articles, and means for locating and retaining said hanging rods against swinging movement while such coupling is being effected, said means for locating and retaining comprising a fork movable in a direction transverse to the path of movement of said carriage and having rockably mounted tines, said fork being fully advanced to locate a tine in front and behind each transversely extending row of hanging rods when the coupling elements are loaded or unloaded, a series of notched plates on each tine spaced the same distance apart as the distance between the handing rods in each transversely extending row, and means for rocking the tines, whereby said notched plates, one in front and one behind each hanging rod, engage and retain said hanging rods.

5. In article treating apparatus having a carriage from which a plurality of coupling elements are individually suspended by means of transversely extending rows of swingingly hung rods, means for locating and retaining said hanging rods against swinging movement while said coupling elements are being loaded or unloaded comprising a fork movable in a direction transverse to the path of movement of said carriage and having rockably mounted tines, said fork being fully advanced to locate a tine in front and behind each transversely extending row of hanging rods when the coupling elements are loaded or unloaded, a series of notched plates on each tine spaced the same distance apart as the distance between the hanging rods in each transversely extending row, and means for rocking the tines, whereby said notched plates, one in front and one behind each hanging rod, engage and retain said hanging rods.

6. Article treating apparatus comprising, in combination, a furnace, a cage receiver located adjacent one end of said furnace, a track extending horizontally above said furnace and said cage receiver, a carriage supported by said track for travel therealong, said furnace having a top with a slot extending beneath said track, a plurality of shafts depending from said carriage and arranged to travel through said slot as said carriage travels along said track, fixture means carried by the lower ends of said shafts, a plurality of rods hanging from each of said fixture means, a joint between each of the upper ends of said hanging rods and said fixture means permitting slight vertical shifting of said hanging rods, said hanging rods being arranged in a definite pattern, a cage having receptacles for articles to be treated, said receptacles being so arranged as to support such articles in a pattern corresponding to the pattern in which said hanging rods are arranged, means for locating said cage in a definite position on said cage receiver, coupling elements for connecting such articles to the lower ends of said hanging rods, and means for moving said cage receiver to couple said coupling elements and subsequently to remove said cage from such articles.

7. Article treating apparatus comprising, in combination, a furnace, a cage receiver located adjacent one end of said furnace, a track extending horizontally above said furnace and said cage receiver, a carriage supported by said track for travel therealong, said furnace having a top with a slot extending beneath said track, a plurality of shafts depending from said carriage and arranged to travel through said slot as said carriage travels along said track, fixture means carried by the lower ends of said shafts, a plurality of rods hanging from each of said fixture means, a joint between each of the upper ends of said hanging rods and said fixture means permitting slight vertical shifting of said hanging rods, said hanging rods being arranged in a definite pattern, a cage having receptacles for articles to be treated, said receptacles being so arranged as to support such articles in a pattern corresponding to the pattern in which said hanging rods are arranged, means for locating said cage in a definite position on said cage receiver, coupling elements for connecting such articles to the lower ends of said hanging rods, means for moving said cage receiver to couple said coupling elements and subsequently to remove said cage from such articles, and means for locating and retaining said hanging rods against swinging movement without hindrance to said slight vertical shifting of said hanging rods while such coupling is being effected.

8. Article treating apparatus comprising, in combination, a furnace, a cage receiver located adjacent one end of said furnace, a track extending horizontally above said furnace and said cage receiver, a carriage supported by said track for travel therealong, said furnace having a top with a slot extending beneath said track, a plurality of shafts depending from said carriage and arranged to travel through said slot as said carriage travels along said track, fixture means carried by the lower ends of said shafts, a plurality of rods hanging from each of said fixture means, a joint between each of the upper ends of said hanging rods and said fixture means permitting slight vertical shifting of said hanging rods, said hanging rods being arranged in a definite pattern, a cage having receptacles for articles to be treated, said receptacles being so arranged as to support such articles in a pattern corresponding to the pattern in which said hanging rods are arranged, means for locating said cage in a definite position on said cage receiver, coupling elements for connecting such articles to the lower ends of said hanging rods, means for moving said cage receiver to couple said coupling elements and subsequently to remove said cage from such articles, and means for locating and retaining said hanging rods against swinging movement without hindrance to said slight vertical shifting of said hanging rods while such coupling is being effected, said means for locating and retaining comprising a fork movable in a direction transverse to the path of movement of said carriage.

9. Article treating apparatus comprising, in combination, a furnace, a cage receiver located adjacent one end of said furnace, a track extending horizontally above said furnace and said cage receiver, a carriage supported by said track for travel therealong, said furnace having a top with a slot extending beneath said track, a plurality of shafts depending from said carriage and arranged to travel through said slot as said carriage travels along said track, fixture means carried by the lower ends of said shafts, a plurality of rods hanging from each of said fixture means, a joint between each of the upper ends of said hanging rods and said fixture means permitting slight vertical shifting of said hanging rods, said hanging rods being arranged in transversely extending rows, a cage having receptacles for articles to be treated, said receptacles being so arranged as to support such articles in a pattern corresponding to the pattern in which said transversely extending hanging rods are arranged, means for locating said cage in a definite position on said cage receiver, coupling elements for connecting such articles to the lower ends of said hanging rods, means for moving said cage receiver to couple said coupling elements and subsequently to remove said cage from such articles, and means for locating and retaining said hanging rods against swinging movement without hindrance to said slight vertical shifting of said hanging rods while such coupling is being effected, said means for locating and retaining comprising a fork movable in a direction transverse to the path of movement of said carriage and having rockably mounted tines, said fork being fully advanced to locate a tine in front and behind each transversely extending row of hanging rods when the coupling elements are loaded or unloaded, a series of notched plates on each tine spaced the same distance apart as the distance between the hanging rods in each transversely extending row, and means for rocking the tines, whereby said notched plates, one in front and one behind each hanging bar, engage and retain said hanging bars.

10. In article treating apparatus having an overhead carriage, in combination, a cluster fixture depending from said carriage, a plurality of hanging rods each having a plurality of notches near one end, a set of spaced pins for each plurality of notches, said pins being mounted in said cluster fixture with their axes extending transverse to the path of movement of said carriage and each engaging a notch whereby said rods are loosely suspended from said cluster fixture and permitted to swing and to shift vertically, and a coupling element attached to the other end of each hanging rod.

11. In article treating apparatus having an overhead carriage, in combination, a cluster fixture depending from said carriage, a plurality of hanging rods each having a pair of arcuately shaped notches near one end, a pair of spaced pins having radii of curvature less than the radii of curvature of said notches for each pair of notches, said pins being mounted in said cluster fixture with their axes extending substantially horizontal and transverse to the path of movement of said carriage and each engaging a notch, and a coupling element attached to the other end of each hanging rod.

12. In article treating apparatus having an overhead carriage, in combination, a cluster fixture depending from said carriage, a plurality of hanging rods each having a pair of substantially parallel flat-bottomed, dish-shaped notches near one end, a pair of spaced pins for each pair of notches, said pins being mounted in said cluster fixture with their axes extending substantially at the same elevation and transverse to the path of movement of said carriage and each engaging a notch, and a coupling element attached to the other end of each hanging rod.

13. In article treating apparatus having a plurality of individually suspended coupling elements, a cage for loading and unloading taper ended, cylindrically shaped articles into and out of the coupling elements comprising a plurality of receptacles, each receptacle including a limit ring near the bottom of said cage for seating the tapered end of said article, said limit ring maintaining said article at a level elevation with every other article in said cage, and a guide ring directly above said limit ring for maintaining said article in vertcal and parallel relationship to every other article in said cage.

14. Article treating apparatus comprising, in combination, an overhead conveyor trolley carriage, a plurality of coupling elements having flared entryways for self-guided receival of cooperating connections fixed to articles, a plurality of hanging rods for suspending each coupling element from said carriage, a joint between each of said hanging rods and said carriage permitting slight vertical shifting of said hanging rods, means for locating and retaining said hanging rods against swinging movement without hindrance to said slight vertical shifting while said coupling elements are being loaded or unloaded, and means for loading and unloading said coupling elements.

15. Article treating apparatus comprising, in combination, an overhead conveyor trolley carriage, a plurality of hanging rods each having a plurality of notches near one end, a set of spaced pins for each plurality of notches, the pins being mounted in said carriage with their axes extending transverse to the path of movement of said carriage and each engaging a notch, whereby said hanging rods are loosely suspended from said carriage and permitted to swing and to shift vertically, a hanger cup attached to the other end of each hanging rod, said cup having a flared entryway for self-guided receival of a cooperating connection fixed to an article, means for locating and retaining said hanging rods against swinging while said hanger cups are being loaded or unloaded, and means for loading and unloading said hanger cups.

References Cited in the file of this patent

UNITED STATES PATENTS

| | | |
|---|---|---|
| 2,061,735 | Larson | Nov. 24, 1936 |
| 2,609,083 | Leach | Sept. 2, 1952 |